(12) United States Patent
Poggi et al.

(10) Patent No.: US 9,315,170 B2
(45) Date of Patent: Apr. 19, 2016

(54) STEERING LOCK WITH A DEADLOCK FOR A MOTOR VEHICLE AND METHOD OF ASSEMBLING SAME

(71) Applicant: VALEO SECURITE HABITACLE, Creteil (FR)

(72) Inventors: Patrice Poggi, Nevers (FR); Christophe Perrin, Nevers (FR); Alix Della Fiorentina, Nevers (FR)

(73) Assignee: U-Shin France SAS, Creteil (FR)

( * ) Notice: Subject to any disclaimer, the term of this patent is extended or adjusted under 35 U.S.C. 154(b) by 0 days.

(21) Appl. No.: 14/365,918

(22) PCT Filed: Dec. 20, 2012

(86) PCT No.: PCT/EP2012/076320
§ 371 (c)(1),
(2) Date: Jun. 16, 2014

(87) PCT Pub. No.: WO2013/092824
PCT Pub. Date: Jun. 27, 2013

(65) Prior Publication Data
US 2014/0345337 A1 Nov. 27, 2014

(30) Foreign Application Priority Data
Dec. 21, 2011 (FR) ...................... 11 03988

(51) Int. Cl.
*B60R 25/021* (2013.01)

(52) U.S. Cl.
CPC ....... *B60R 25/02134* (2013.01); *B60R 25/0211* (2013.01); *Y10T 29/49826* (2015.01); *Y10T 70/5611* (2015.04)

(58) Field of Classification Search
CPC ............ Y10T 70/5664; Y10T 70/5956; Y10T 70/5611; Y10T 70/5659; Y10T 70/56125; Y10T 29/49826; B60R 25/02134; B60R 25/02126; B60R 25/0211
USPC ........................................... 70/180–189, 252
See application file for complete search history.

(56) References Cited

U.S. PATENT DOCUMENTS 1,645,382 A * 10/1927 Hershey .................... 200/43.08
4,143,528 A * 3/1979 Weber et al. ..................... 70/1.5
(Continued)

FOREIGN PATENT DOCUMENTS

| EP | 0 953 487 A1 | 11/1999 |
|---|---|---|
| EP | 1 167 135 A1 | 1/2002 |

(Continued)

OTHER PUBLICATIONS

International Search Report issued in PCT/EP2012/076320 mailed on Apr. 5, 2013 (4 pages).

*Primary Examiner* — Christopher Boswell
*Assistant Examiner* — Amanda L Miller
(74) *Attorney, Agent, or Firm* — Osha Liang LLP (57) ABSTRACT

The invention relates to a steering lock with a deadlock for a motor vehicle comprising: •a bolt guide (5), •a bolt (4), •a deadlocking means (15) comprising a locking element (16) designed to lock the bolt (4) in deadlocked position and to be subjected to torsional and translational movement towards said bolt (4), said element (16) being received in a housing (18) of the bolt guide (5). The deadlocking means (15) further comprises a closing plate (10) having a face that engages with an element of the deadlocking means (15), and engages with the opening of the housing (18) in such a way that the rotation of the closing plate (10) is locked relative to the guide bolt (5) and causes the translational and torsional movement of said locking element (16).

18 Claims, 5 Drawing Sheets

(56) References Cited

U.S. PATENT DOCUMENTS

| | | | |
|---|---|---|---|
| 8,001,814 B2 * | 8/2011 | Okada et al. | 70/186 |
| 8,240,176 B2 * | 8/2012 | Okada | 70/182 |
| 8,272,239 B2 * | 9/2012 | Fong | 70/185 |
| 2002/0066295 A1 * | 6/2002 | Jacobs et al. | 70/186 |
| 2004/0075232 A1 * | 4/2004 | Zillmann | 280/89 |
| 2004/0148983 A1 * | 8/2004 | Suzuki et al. | 70/186 |
| 2008/0110219 A1 * | 5/2008 | Maltaverne et al. | 70/210 |
| 2009/0064739 A1 * | 3/2009 | Trischberger et al. | 70/237 |
| 2009/0266122 A1 * | 10/2009 | Okada et al. | 70/252 |
| 2011/0167885 A1 * | 7/2011 | Sugimoto | 70/186 |

FOREIGN PATENT DOCUMENTS

| | | | | |
|---|---|---|---|---|
| EP | 2 025 567 A2 | 2/2009 | | |
| FR | 2 952 332 A1 | 5/2011 | | |
| FR | WO 2012028324 A1 * | 3/2012 | | B60R 25/02126 |
| JP | EP 2596997 A1 * | 5/2013 | | B60R 25/02153 |

* cited by examiner

Fig.8

STEERING LOCK WITH A DEADLOCK FOR A MOTOR VEHICLE AND METHOD OF ASSEMBLING SAME

The present invention relates to an anti-theft lock for securing a vehicle steering mechanism. More particularly, the present invention relates to an anti-theft lock using a movable bolt suitable for being locked by deadlocking means. The invention also relates to a method for assembling the anti-theft lock.

Anti-theft locks comprise locking means comprising a bolt movably mounted in an anti-theft lock body, between an unlocked position wherein it is intended to be arranged away from a steering column, and a locked position wherein it is intended to lock said column. The bolt is moved via a rotary lock integrated in the anti-theft lock body.

Some increased security anti-theft locks further comprise deadlocking means suitable for locking the bolt in the locked position, in the event of attempted forcible entry. A malicious person may indeed decide to pull out the lock to access the bolt, in order to disable same with a view to releasing the rotation of the steering column. The presence of the deadlocking means makes it possible to hold the bolt in the locked position thereof, such that the column nonetheless remains locked in rotation. The deadlocking means are for example arranged in a supporting member mounted on the anti-theft lock body.

One drawback of the anti-theft lock devices according to the prior art comprising deadlocking means is the size resulting from the assembly of the various parts, particularly if said parts are isolated to protect same against attempted forcible entries.

Furthermore, said devices are long and tedious to assemble and install.

One of the aims of the present invention is that of providing an anti-theft lock having less bulky deadlocking means than those of the prior art, which is easier to use and has a high resistance to attacks by malicious persons.

For this, the invention relates to a steering lock for a motor vehicle with a deadlock comprising:
- a bolt guide,
- a bolt movably mounted in the bolt guide between an unlocked position wherein it is intended to be arranged away from a steering column, and a locked position wherein it is intended to lock said column,
- deadlocking means comprising a locking element designed to lock the bolt in the locked position and to be subjected to torsional and translational movement towards said bolt, said locking element being received in a housing of the bolt guide away from the bolt in the unlocked position, characterised in that the deadlocking means further comprise a closing plate having a face engaging with an element of the deadlocking means, said closing plate engaging with the opening of the housing of the bolt guide in such a way that the rotation of the closing plate relative to the bolt guide is locked and actuates the translational and torsional movement of said locking element.

The deadlocking means are thus integrated in the bolt guide without increasing the size of the anti-theft lock and without a mounted supporting member to house the deadlocking means.

In addition to the reduced size, the protection of the anti-theft lock is increased by the use of a closing plate which is simple to produce. It is thus possible to readily and substantially enhance the shielding of the anti-theft lock, unlike the anti-theft locks according to the prior art comprising mounted supporting members for the deadlocking means.

Furthermore, the assembly of the closing plate on the bolt guide makes it possible to actuate torsional and translational movement of the locking element simply and reproducibly.

Furthermore, once assembled, the closing plate, sandwiched between the first part of the anti-theft lock body and the bolt guide, is locked against the housing of the bolt guide. The closing plate is thus rendered invisible and inaccessible, which increases the protection of the anti-theft lock.

Moreover, applied to deadlocking means with two successive movements of the locking element, the locking element actuated in torsional and translational movement locks the bolt in the locked position in the event of attempted forcible entry of the lock and can no longer merely return to the passive initial position. Two reverse successive movements must be performed to disengage the locking elements from the bolt, which complicates the disengagement of the deadlocking means, complicating the reversibility thereof.

According to one or a plurality of features of the anti-theft lock, taken alone or in combination:
- the closing plate comprises at least one anti-rotation pin engaging with a complementary notch formed in the opening of the housing of the bolt guide,
- the bolt guide comprises at least one ramp formed in an arc of a circle arranged upstream from said notch and engaging with said anti-rotation pin during the closure of the closing plate so as to generate torsional pre-stress of the locking elements by guiding the anti-rotation pin in rotation in said ramp,
- the circular profile of the ramp makes one quarter-turn,
- the closing plate is crimped against the housing of the bolt guide,
- the closing plate has a general disk shape and comprises two diametrically opposed anti-rotation pins,
- the closing plate is crimped against the housing of the bolt guide,
- the closing plate is made of steel,
- the housing of the bolt guide is configured to engage with said locking element by guiding same towards the bolt along successive translational and rotational movements, following the removal of a member for holding the deadlocking means to lock said bolt in the locked position,
- the housing of the bolt guide is configured to lock the pivoting of said locking element, and the translational movement of said locking element along an axial stroke in the direction of said bolt disengages said locking element enabling the pivoting thereof along an angular stroke,
- said locking element has a pin shape,
- the base of the locking element arranged facing the closing plate comprises a radial strip,
- said element of the deadlocking means comprises elastic means, said closing plate engaging with said elastic means and the opening of the housing to actuate the locking element in translational and torsional movement,
- the elastic means is secured in a central contact point arranged on one face of the closing plate,
- the deadlocking means comprise a holding member suitable for holding the locking element away from the bolt in the unlocked position,
- the anti-theft lock comprises an anti-theft lock body, an anti-theft lock module comprising the bolt guide, the bolt and deadlocking means, said anti-theft lock module being housed in the anti-theft lock body and the anti-theft lock body locking the closing plate against the housing of the bolt guide, the anti-theft lock body comprises a first and a second part of the anti-theft lock body and a lock inserted in said second part of the anti-theft lock body, said first part of the anti-theft lock body receiving said anti-theft lock module.

The invention also relates to a method for assembling an anti-theft lock as described above, characterised in that it comprises:

a first step wherein an anti-theft lock module with a deadlock is formed:
by positioning the closing plate against the opening of the housing of the bolt guide, the closing plate compressing the elastic means, said anti-rotation pin being placed at the start of said ramp,
by turning the closing plate along the profile of said ramp until the closing position is reached wherein said anti-rotation pin is engaged in said complementary notch, the closing plate then being locked in rotation relative to the bolt guide, compresses the elastic means and subjects same to torsional pre-stress, and
by securing the closing plate to the bolt guide in the closing position, and a second step wherein the anti-theft lock module with a deadlock assembled in this way is inserted into the anti-theft lock body which then locks the closing plate against the housing of the bolt guide.

In the closing position, the closing plate is for example crimped against the opening of the housing of the bolt guide.

Further advantages and features will emerge on reading the description of a non-limiting example of an embodiment of the invention, along with the amended figures wherein.

In these figures, identical elements bear the same reference numbers.

Figure 1:
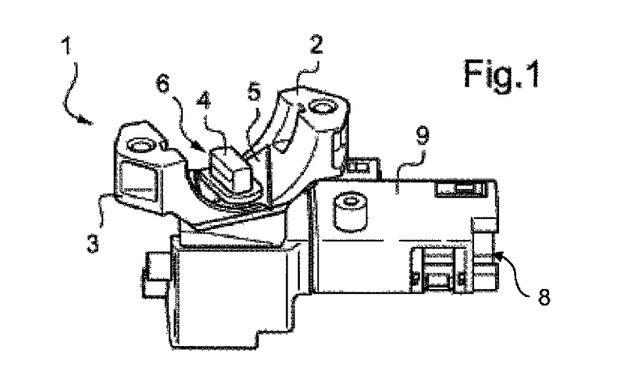
FIG. 1 represents a perspective view of elements of an anti-theft lock in the assembled state.

FIGS. 1 to 11 illustrate an example of embodiment of a steering lock for a motor vehicle 1. The anti-theft lock 1 comprises a clamping collar having a first half-collar and a second half-collar 2, only one of which is represented in FIG. 1, configured to be assembled around a steering column (not shown).

The second half-collar 2 is integrated in a first part of the anti-theft lock body 3 (FIG. 2) housing an anti-theft lock module with a deadlock 6 comprising means for locking the steering column and deadlocking means arranged to lock the locking means in the locked position following attempted forcible entry of the anti-theft lock 1. The first part of the anti-theft lock body 3 is for example made of "Zamak" material so as to have a good mechanical resistance in position on the column, protecting the locking and deadlocking means.

The locking means comprise a bolt 4 slidably mounted in the first part of the anti-theft lock body 3, via a bolt guide 5 of the anti-theft lock 1, between an unlocked position wherein it is in the rear retracted position, away from the steering column and a locked position (FIG. 1) wherein it is intended to lock the column by projecting from the second half-collar 2 to engage conventionally by nesting with an element of the steering column. The locking means further comprise means (not shown) for actuating the bolt 4 suitable for actuating the bolt 4 in the locked or unlocked position. The movement of the actuation means is controlled by the rotation of a lock rotor.

The lock is intended to be inserted and secured inside a second part of the anti-theft lock body 9, for example made of plastic, of the anti-theft lock 1, also partially covering the first part of the anti-theft lock body 3. In a manner known per se, a cam of the anti-theft lock 1 is intended to be secured to the rear end of the lock. Once mounted together in the second part of the anti-theft body 9, the lock rotor and the cam rotate together, a first part of the cam actuating the means for actuating the bolt 4.

The anti-theft lock 1 comprises a more vulnerable breakaway zone, intended to give way first in the event of torsional, flexural, tearing stress, etc. The breakaway zone thus separates a front part of the anti-theft lock 1 comprising the lock, from a rear part comprising the first part of the anti-theft lock body 3 and the locking and deadlocking means. In this way, rupture of the anti-theft lock at the breakaway zone is favoured, to guarantee deadlocking of the locking means in the event of vandalism.

Figure 2:
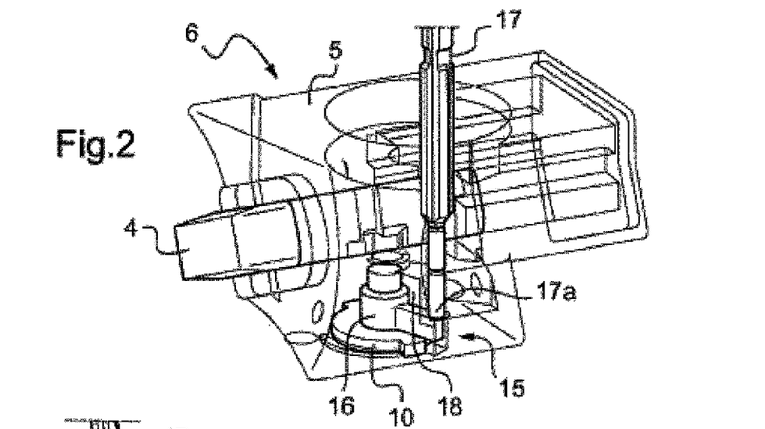
FIG. 2 represents an anti-theft lock module of the anti-theft lock in FIG. 1, wherein the deadlocking means can be made out by transparency in the passive state.
Figure 3:
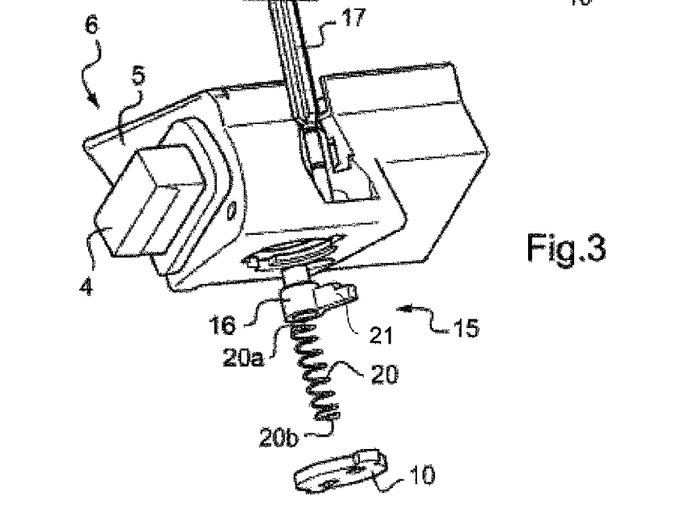
FIG. 3 represents the anti-theft lock module in FIG. 2 in the disassembled state.

Seen more clearly in FIGS. 2 and 3, the deadlocking means 15 comprise a locking element 16 configured to lock the bolt 4 in the locked position, elastic means 20, a holding element 17 and a closing plate 10.

According to the invention, the locking element 16 is configured to lock the bolt 4 in the locked position and to be actuated in torsional and translational movement towards said bolt 4. The locking element 16 is received in a housing 18 of the bolt guide away from the bolt 4 in the unlocked position.

The closing plate 10 has a face engaging with an element of the deadlocking means 15, said closing plate 10 engaging with the opening of the housing 18 of the bolt guide in such a way that the rotation of the closing plate 10 relative to the bolt guide 5 is locked and actuates the translational and torsional movement of said locking element 16.

More specifically and according to the example illustrated, the holding member 17 comprises for example a rod wherein a first end 17*a* is intended to press the locking element 16 to hold same in the passive position (or idle position wherein the locking element 16 is away from the bolt 4). The second end of the rod of the holding member 17 is intended to be attached to the lock (not shown). The holding member 17 is removed in the event of an attempt to detach the lock.

The elastic means 20 comprise for example a spring, such as a helical spring, wherein a first end 20*a* is attached to the locking element 16 and the second end 20*b* is attached to a face of the closing plate 10.

The locking element 16 and the elastic means 20 are received in the housing 18 opening from the bolt guide 5.

The locking element 16 is actuated in torsional and translational movement towards the bolt 4 by the elastic means 20 and is held in the passive position by the holding member 17.

In the closing position, the closing plate 10 engages with the opening of the housing 18 of the bolt guide 5 such that the rotation of the closing plate 10 relative to the bolt guide 5 is locked and such that the elastic means 20 are compressed and subjected to torsional pre-stress.

For this, the closing plate 10 comprises at least one pin, for example two anti-rotation pins 10*a*, 10*b* (FIGS. 4*a*, 4*b*) engaging in the closing position with two complementary notches 11*a*, 11*b* formed in the opening of the housing 18 of the bolt guide 5.

It is further envisaged that the opening of the housing 18 of the bolt guide 5 comprises two ramps 12*a*, 12*b* respectively arranged upstream from the two notches 11*a*, 11*b*. The ramps 12*a*, 12*b* are formed in an arc of a circle and engage with the respective anti-rotation pins 10*a*, 10*b* during the closure of the closing plate 10 so as to generate torsional pre-stress of the elastic means 20 by rotatably guiding the anti-rotation pins 10*a*, 10*b* in the ramps 12*a*, 12*b*.

More specifically in this embodiment, the closing plate 10 has for example a general disk shape to facilitate the rotatable assembly thereof in the opening of the housing 18.

The anti-rotation pins 10*a*, 10*b* then have the shape of small flat rectangular fins projecting in a diametrically opposite manner from the closing plate 10.

Furthermore, the notches 11*a*, 11*b* extend along a substantially perpendicular direction to the plane of the closing plate 10 so as to lock the rotation of the anti-rotation pins 10*a*, 10*b*, once said pins are engaged in the complementary notches 11*a*, 11*b*.

The length of the arc of the ramps corresponds to the torsional pre-stress angle of the elastic means 20. For example, to generate torsional pre-stress in the region of 90°, the circular profile of each ramp 12*a*, 12*b* makes one quarter-turn.

Figure 4A:
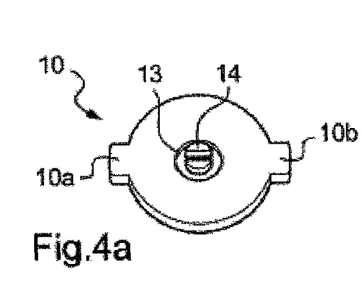
FIG. 4*a* represents a front view of the closing plate of the deadlocking means.

As can be seen in FIG. 4*a*, the second end of the elastic means is attached to the centre of one face of the closing plate 10. For this purpose, the closing plate 10 comprises for example a central recess 13 in the shape of a disk to centre the elastic means 20 and a slotted cylindrical central block 14, the second end 20*b* of the elastic means 20 being attached in the slot of the block 14. The same device is for example envisaged in the base of the locking element 16 to hold the first end 20*a* of the elastic means 20.

Figure 4B:
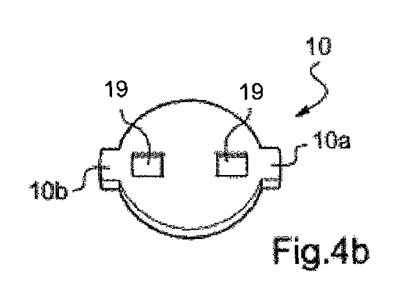
FIG. 4*b* represents a rear view of the face of the closing plate in FIG. 4*a*.
Figure 5:
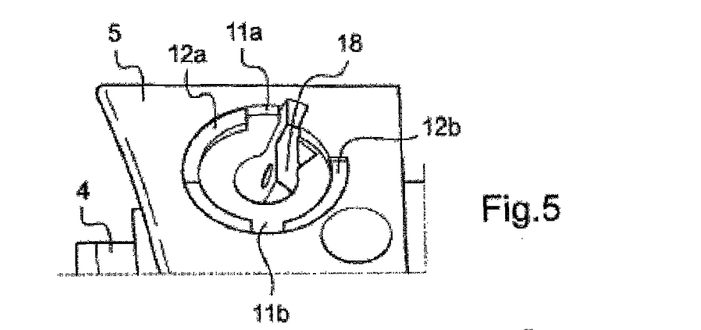
FIG. 5 represents a detailed view of the bolt guide.

It can further be envisaged that the outer face of the closing plate 10, opposite the face attached to the elastic means 20, comprises a cavity 19 suitable for engaging with a suitable tool for rotating the closing plate 10 along the ramps 12*a*, 12*b* (FIG. 4*b*).

To increase the protection of the anti-theft lock further, a more robust steel closing plate 10 is envisaged. The production of the steel plate is very simple and inexpensive since it is in fact merely necessary to cut same in a steel sheet.

During the assembly of the anti-theft lock 1, the elastic means 20 are initially attached to the locking element 16 and to the closing plate 10, the closing plate 10 being away from the bolt guide 5.

Figures 6A, 6B:
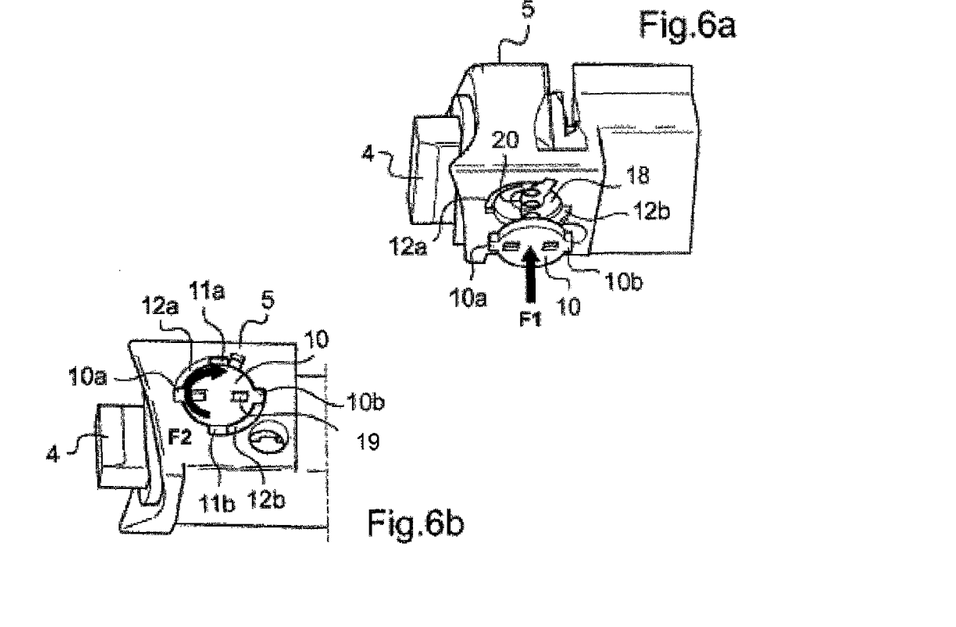
FIG. 6*a* represents a first step of a method for assembling the anti-theft lock in FIG. 1.
FIG. 6*b* represents a second step of the assembly method.

Then, in a first step (FIG. 6*a*), the closing plate 10 is positioned against the opening of the housing 18 of the bolt guide 5, the anti-rotation pins being placed at the start of the ramps (arrow F1). The closing plate 10 then compresses the elastic means 20 (FIG. 6*b*).

Figure 6C:
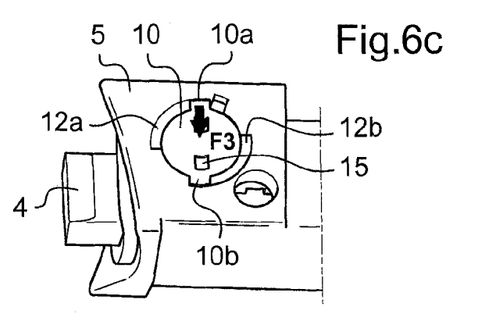
FIG. 6*c* represents the closing position of the closing plate on the bolt guide.

In a second step (FIG. 6*b*), the closing plate 10 is rotated for example using a tool inserted in the cavity 19 (arrow F2), along the profiles of the ramps 12*a*, 12*b* until the closing position is reached wherein the anti-rotation pins 10*a*, 10*b* are engaged in the complementary notches 11*a*, 11*b* (FIG. 6*c*, arrow F3). In the example shown, the closing plate 10 thus performs a rotation in the region of one quarter-turn.

Engaged in the closing position in this way (FIG. 6*c*), the closing plate 10 locked in rotation relative to the bolt guide 5, compresses the elastic means 20 and subjects same to torsional pre-stress.

Then, in a third step (FIG. 6*d*), the closing plate 10 is locked in the closing position, for example by crimping, clamping, screwing, pinning or pre-securing with a tool, the closing plate 10 against the opening of the housing 18. In the case of crimping, the crimping zones are for example situated between the closing plate 10 and the opening between each ramp start and the upstream notch in the direction of rotation of the closing plate 10 (see the representation of the zones Z in FIG. 6*d*).

The anti-theft lock module with a deadlock 6 comprising the bolt guide 5, the locking means and deadlocking means are thus assembled.

In a fourth step (FIG. 6*e*), the assembled anti-theft lock module 6 with a deadlock is inserted in the first part of the anti-theft lock body 3 (arrow F4).

Figures 6D, 6E, 6F:
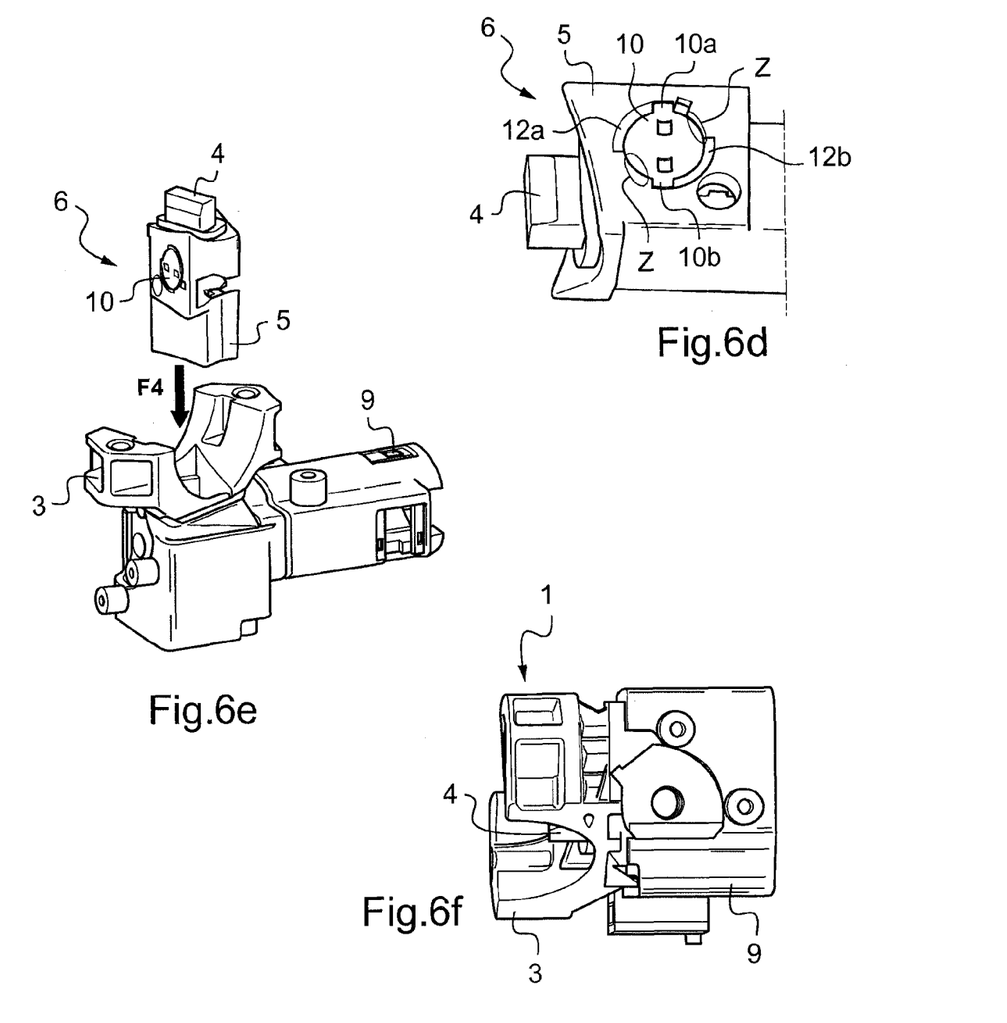
FIG. 6*d* represents a third step of the assembly method.
FIG. 6*e* represents a fourth step of the assembly method.
FIG. 6*f* represents a view similar to FIG. 1, the anti-theft lock being pivoted to the side.
Figures 6G, 7:
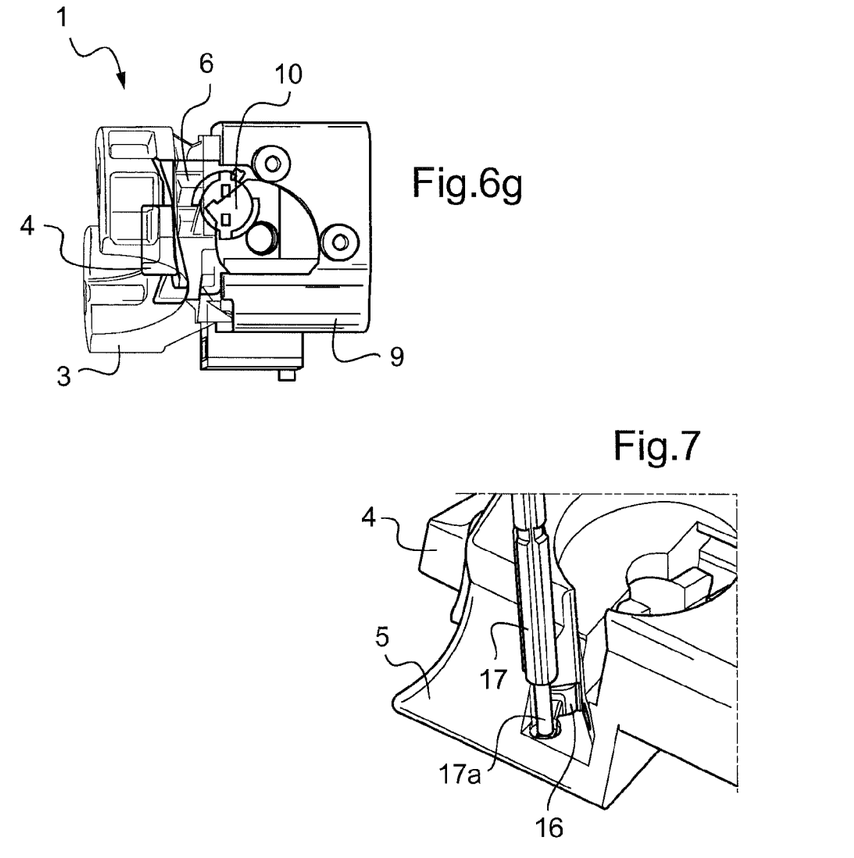
FIG. 6*g* is a view similar to FIG. 6*f*, wherein the anti-theft lock can be made out by transparency from the anti-theft lock body.
FIG. 7 represents a further view of the anti-theft lock module in FIG. 2 in the passive state.

Once the anti-theft lock module 6 has been received in the first part of the anti-theft lock body 3, the anti-theft lock 1 is assembled (FIGS. 1, 6*f* and 6*g*). The immobilisation means (crimping, clamping, screwing, pre-securing, etc.) are merely used to secure the closing plate 10 to the bolt guide until the anti-theft lock module 6 is received in the anti-theft lock body. Indeed, once the anti-theft lock has been assembled, the closing plate 10 is sandwiched between the first part of the anti-theft lock body and the bolt guide 5. The anti-theft lock body 3 then locks the closing plate 10 against the housing 18 of the bolt guide 5.

The closing plate 10 is thus rendered invisible and inaccessible, increasing the protection thereof.

The deadlocking means 15 are thus integrated in the bolt guide 5 without increasing the size of the anti-theft lock 1. In addition to the reduced size, the protection of the anti-theft lock may be increased further using a steel closing plate 10, which is more robust and easier to produce.

Furthermore, the assembly of the closing plate 10 on the bolt guide 5 enables simple and reproducible direct torsional and compression pre-stress of the elastic means 20.

According to one example of application, the housing 18 of the bolt guide 5 is configured to engage with the locking element 16 by guiding same towards the bolt 4 along a first translational movement D1 and a second successive rotational movement D2, following the removal of the holding member 17 to lock the bolt 4 in the locked position. Although not described, it is also possible to envisage conversely that the first movement is a rotation and the second movement a translation.

For this, the shape of the housing 18 locks the pivoting of the locking element 16 and allows the translational movement thereof in the event of removal of the holding element 17 along an axial stroke C1 in the direction of the bolt 4. This translational movement disengages the locking element 16, allowing the pivoting thereof along an angular stroke C2.

The locking element 16 has for example a cylindrical pin shape wherein the base comprises a radial strip 21.

A first part of the housing 18 situated on the side of the opening, has a complementary shape relative to the radial strip 21 and further extends axially along the distance C1 towards the bolt 4. In this way, this first part of the housing 18 engages with the radial strip 21 to lock the pivoting of the locking element 16 and allow the translational movement thereof in the event of removal of the holding element 17 along an axial stroke C1 in the direction of the bolt 4.

A second part of the housing 18, following the first part, has an angle clearance C2. The angle C2 may adopt any value between 0° and the torsional pre-stress angle of the elastic means 20.

Given that, in this example, the torsional pre-stress applied to the elastic means 20 is in the region of 90°, it is envisaged for example that the angle C2 is in the region of 15 to 20° such that the elastic torsional load is still active when the radial strip 21 is at a stop in the clearance of the housing 18. In this way, the second part of the housing 18 engages with the radial strip 21 to allow the pivoting of the locking element 16 projecting from the first part of the housing, along an angle C2.

Figure 8:
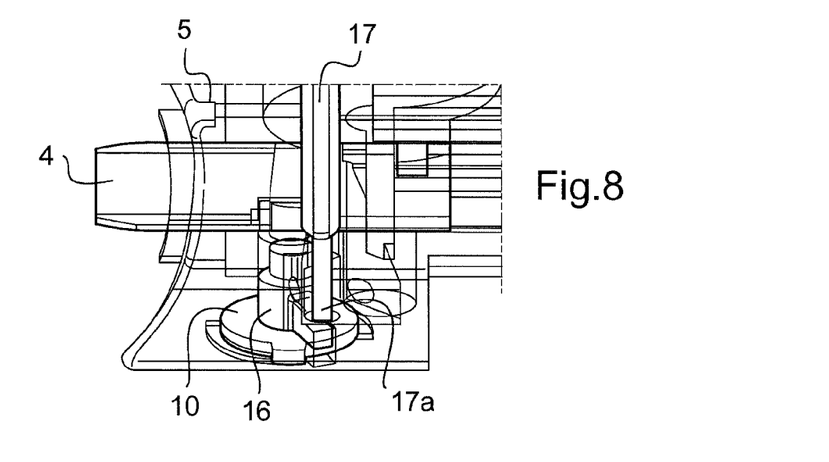
FIG. 8 represents a view similar to FIG. 2 of the anti-theft lock module, wherein the deadlocking means can be made out by transparency, in the passive state.
Figure 9:
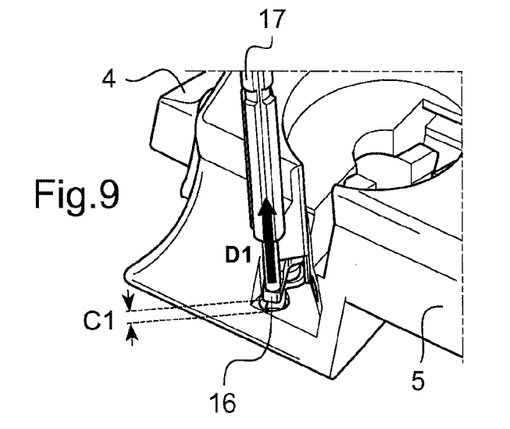
FIG. 9 illustrates the removal of the holding member and the translational movement of the locking element.
Figure 10:
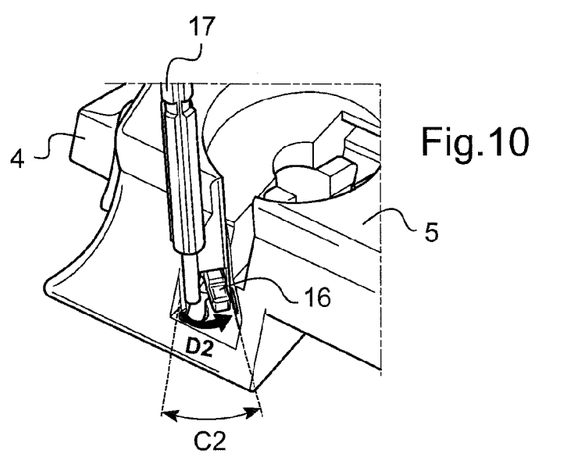
FIG. 10 illustrates the rotation of the locking element.

In the passive position (FIG. 7), the locking element 16 received in the housing 18 is actuated elastically by a torsional movement about the axis of rotation thereof but it is kept locked in rotation by the side walls of the first part of the housing 18. The locking element 16 is further actuated against the bolt 4 and held away by the first end 17a of the rod of the holding member 17 which presses on the nose of the radial strip 21 of the locking element 16 to hold same. The locking element is in the passive position since it does not lock the bolt 4 (FIG. 8).

If the lock 8 is pulled out by a malicious person, the holding member 17, wherein the second end is secured to the lock, is actuated with the lock 8 along the direction of the arrow D1 (FIG. 9) and no longer presses on the nose of the radial strip 21. The locking element 16 actuated in a torsional and translational movement towards the bolt 4 by the elastic means 20, which are no longer held in translation but remain locked in rotation, performs a translational movement projecting towards the bolt 4. The translational movement of the locking element 16 in the direction of the bolt 4 along the axial stroke C1 disengages the base of the locking element 16 of the first part of the housing 18 towards the second part of the housing 18. The locking element 16 actuated by a torsional and translational movement towards the bolt 4 by the elastic means 20 then pivots along the arrow D2 (FIG. 10) to an abutment of the housing after an angular stroke C2.

Figure 11:
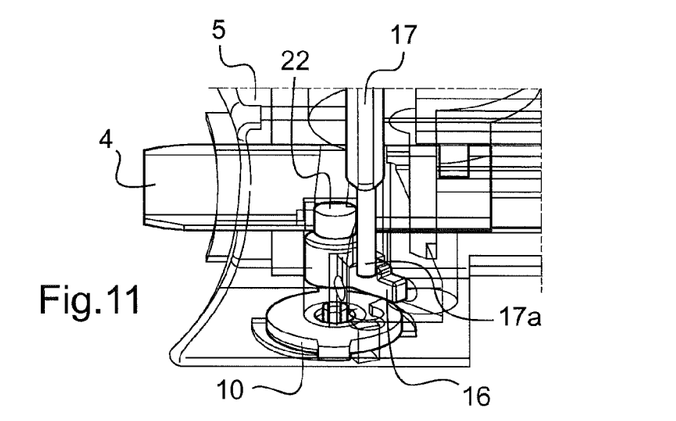
FIG. 11 represents the bolt locked in the locked position.

The cylindrical pin of the locking element 16 is partially engaged in a cavity 22 of the bolt 4 and locks same in the locked position (FIG. 11).

Once the locking element 16 has performed a translational movement and pivoted in the housing 18, it can no longer merely return to the initial passive position. Two reverse successive movements should be performed to disengage the locking element 16 from the cavity 22 of the bolt 4, increasing the difficulty of disengagement of the deadlocking means 15, complicating the reversibility thereof.

The dual consecutive translational and rotational movement of the locking element 16 prevents a malicious person from pushing the locking element back against the elastic return thereof. Similarly, in the event of forcible rotation of the lock or forcible flexion of the lock, the holding member 17 secured to the lock, breaks and is pushed back towards the exterior of the anti-theft lock body 3 by the elastic means. As above, the locking element 16 which is no longer held may then lock the bolt 4 in the locked position.

In this way, in the event of pulling of the lock, forcible rotation or flexion of the lock, the deadlocking means 15 are engaged, locking the bolt 4 in the locked position. The locking element 16 can no longer merely return to the initial position without performing two reverse successive movements D2, D1 to disengage from the bolt 4, increasing the security of the anti-theft lock 1.

The invention claimed is:

1. A steering lock for a motor vehicle with a deadlock comprising:
   a bolt guide;
   a bolt movably mounted in the bolt guide between an unlocked position in which the bolt is arranged away from a steering column and a locked position in which the bolt locks the column; and
   deadlocking means comprising a locking element to lock the bolt in the locked position, the locking element being subjected to a torsional movement and a translational movement towards the bolt, and the locking element being received in a housing of the bolt guide away from the bolt in the unlocked position,
   wherein the deadlocking means further comprise a closing plate having a face engaging with an element of the deadlocking means, the closing plate engaging with an opening of the housing of the bolt guide so that a rotation of the closing plate relative to the bolt guide is locked and actuates the torsional movement and the translational movement of the locking element.

2. The steering lock of claim 1, wherein the closing plate comprises at least one anti-rotation pin engaging with a complementary notch formed in the opening of the housing of the bolt guide.

3. The steering lock of claim 2, wherein the bolt guide comprises at least one ramp formed in an arc of a circle arranged adjacent to the notch and engaging with the anti-rotation pin during a closure of the closing plate so as to generate torsional pre-stress of the locking element by guiding the anti-rotation pin in rotation in the ramp.

4. The steering lock of claim 3, wherein the circular profile of the ramp makes one quarter-turn.

5. The steering lock of claim 2, wherein the closing plate has a general disk shape and comprises two diametrically opposed anti-rotation pins.

6. The steering lock of claim 1, wherein the closing plate is crimped against the housing of the bolt guide.

7. The steering lock of claim 1, wherein the closing plate is made of steel.

8. The steering lock of claim 1, wherein the housing of the bolt guide is configured to engage with the locking element by guiding the locking element towards the bolt by way of successive translational and rotational movements, following the removal of a member for holding the deadlocking means to lock the bolt in the locked position.

9. The steering lock of claim 8, wherein the housing of the bolt guide is configured to lock the torsional movement of the locking element, and wherein the translational movement of the locking element along an axial stroke in the direction of the bolt disengages the locking element from the housing and enables the torsional movement thereof along an angular stroke.

10. The steering lock of claim 1, wherein the locking element has a pin shape.

11. The steering lock of claim 10, wherein a base of the locking element arranged facing the closing plate comprises a radial strip.

12. The steering lock of claim 1, wherein the locking element of the deadlocking means comprises elastic means, the closing plate engaging with the elastic means and the opening of the housing to actuate the torsional movement and the translational movement of the locking element.

13. The steering lock of claim 12, wherein the elastic means is secured in a central contact point arranged on one face of the closing plate.

14. The steering lock of claim 1, wherein the deadlocking means comprise a holding member suitable for holding the locking element away from the bolt in the unlocked position.

15. The steering lock of claim 1, further comprising an anti-theft lock body, an anti-theft lock module comprising the bolt guide, the bolt and deadlocking means, the anti-theft lock module being housed in the anti-theft lock body and the anti-theft lock body locking the closing plate against the housing of the bolt guide.

16. The steering lock of claim 15, wherein the anti-theft lock body comprises a first and a second part of the anti-theft lock body and a lock inserted in the second part of the anti-theft lock body, the first part of the anti-theft lock body receiving the anti-theft lock module.

17. A method for assembling an anti-theft lock, comprising:
forming an anti-theft lock module with a deadlock by:
positioning a closing plate of the deadlock against an opening of a housing of a bolt guide, the closing plate compressing an elastic means of the deadlock;
placing an anti-rotation pin of the closing plate at a start of a ramp of the opening of the housing of the bolt guide;
turning the closing plate along a profile of the ramp until a closed position is reached, wherein, in the closed position, the anti-rotation pin is engaged in a complementary notch of the opening of the housing of the bolt guide and the closing plate is locked in rotation relative to the bolt guide, compresses the elastic means, and subjects the elastic means to torsional pre-stress; and
securing the closing plate to the bolt guide in the closed position; and
inserting the assembled anti-theft lock module with the deadlock into an anti-theft lock body such that the closing plate is locked against the housing of the bolt guide.

18. The method for assembling the anti-theft lock of claim 17, wherein, in the closed position, the closing plate is crimped against the opening of the housing of the bolt guide.

* * * * *